US012668458B2

(12) United States Patent
Sørensen

(10) Patent No.: US 12,668,458 B2
(45) Date of Patent: Jun. 30, 2026

(54) PLATFORM LIFTING SYSTEM

(71) Applicant: LIFTUP A/S, Støvring (DK)

(72) Inventor: Brian Bach Sørensen, Støvring (DK)

(73) Assignee: LIFTUP A/S, Støvring (DK)

( * ) Notice: Subject to any disclaimer, the term of this patent is extended or adjusted under 35 U.S.C. 154(b) by 0 days.

(21) Appl. No.: 19/117,459

(22) PCT Filed: Oct. 5, 2023

(86) PCT No.: PCT/EP2023/077639

§ 371 (c)(1),
(2) Date: Apr. 1, 2025

(87) PCT Pub. No.: WO2024/078973

PCT Pub. Date: Apr. 18, 2024

(65) Prior Publication Data

US 2026/0077979 A1 Mar. 19, 2026

(30) Foreign Application Priority Data

Oct. 10, 2022 (EP) .................................... 22200578

(51) Int. Cl.

| | |
|---|---|
| ***B66B 11/04*** | (2006.01) |
| ***B66B 7/06*** | (2006.01) |
| ***B66B 11/00*** | (2006.01) |

(52) U.S. Cl.

CPC .......... *B66B 11/0469* (2013.01); *B66B 7/062* (2013.01); *B66B 11/0045* (2013.01)

(58) Field of Classification Search

CPC ............... B66B 11/0476; B66B 11/007; B66B 11/0469; B66B 11/0045; B66B 7/062

See application file for complete search history.

(56) References Cited

U.S. PATENT DOCUMENTS 7,543,685 B2 6/2009 Ach et al.
8,757,017 B2 6/2014 Bauer et al.

FOREIGN PATENT DOCUMENTS

CN 112520285 A 3/2021
CN 113104700 A * 7/2021 .............. B66B 7/02

(Continued)

OTHER PUBLICATIONS

Machine Translation of JP 2009-179436.*

(Continued)

*Primary Examiner* — Diem M Tran

(74) *Attorney, Agent, or Firm* — J. Peter Paredes; Amin Wasserman Gurnani LLP

(57) ABSTRACT

The present invention relates to a platform lifting system for transporting a person or an object from at least a first level to a second level, wherein the lifting system comprises a compact drive system with a toothed belt and a belt drive. The invention relates to a platform lifting system (100) for transporting a person or an object from at least a first level to a second level, a drive unit (200), a platform (300), at least two vertical columns (400), a drive system (500), and drive system comprises a toothed belt (520) and a belt drive (510). The drive unit (200) is mounted between the two columns (400), said drive unit can be placed anywhere within an area defined by the two columns. The toothed belt (520) and the belt drive (510) are mounted in the vertical column (400). Furthermore, the invention relates to a method for moving a platform of a platform lifting system (100) from at least a first level to second level.

14 Claims, 8 Drawing Sheets

(56) References Cited

FOREIGN PATENT DOCUMENTS

| | | | | | |
|---|---|---|---|---|---|
| CN | 115258887 | A | * | 11/2022 | ............. B66B 11/02 |
| DE | 19738988 | A1 | | 3/1998 | |
| GB | 2022936 | B | | 3/1982 | |
| JP | 2000085296 | A | * | 3/2000 | |
| JP | 2009179436 | A | | 8/2009 | |
| JP | 2013165746 | A | | 8/2013 | |
| WO | WO-2008056020 | A2 | * | 5/2008 | ........... B66B 11/008 |

OTHER PUBLICATIONS

WIPO/ISA/EPO, International Search Report and Written Opinion issued in corresponding International Application No. PCT/EP2023/077639 on Nov. 23, 2023, 13 pages.

European Patent Office, Extended European Search Report issued in corresponding European Patent Application No. 22200578.7 on Mar. 17, 2023, 8 pages.

* cited by examiner

PLATFORM LIFTING SYSTEM

CROSS-REFERENCE TO RELATED APPLICATIONS

The present application claims priority to PCT application serial no. PCT/EP2023/077639, filed Oct. 5, 2023, which claims priority to European patent application serial no. 22200578.7, filed on Oct. 10, 2022, each herein incorporated by reference in their entireties.

FIELD OF THE INVENTION

The present invention relates to a platform lifting system for transporting a person or an object from at least a first level to a second level, wherein the lifting system comprises a compact drive system with a toothed belt and a belt drive.

BACKGROUND OF THE INVENTION

Within the field of lifting systems, especially platform lifting systems, it is known that the mounting and installation of the lifting system might be quite problematic due to the fact that a platform lifting system must fulfil certain requirements and must provide a certain amount of opportunities, while the lifting system also has to be reliably and effectively mounted and installed on a building, outside or inside.

Most platform lifting systems known today have a standard configuration and arrangement of the lifting system and the possibility of changing or altering the configuration is extremely limited. Consequently, the potential positions of the platform lifting system are limited to very specific locations in or on a building, since known platform lifting system are often mounted on or in already existing buildings.

The missing opportunity of adapting a platform lifting system relative to the building it is to be mounted and installed on or in, is making the choice of mounting positions of lifting systems exceptionally limited.

Hence, an improved lifting system and method for moving a platform of a platform lifting system from a first level to second level would be advantageous, and in particular, a more efficient, reliable and/or modifiable, adaptable and compact platform lifting system and method would be advantageous.

OBJECT OF THE INVENTION

In particular, it may be seen as an object of the present invention to provide a lifting system that solves the above mentioned problems of the prior art to obtain a more compact and flexible design.

It is a further object of the present invention to provide a lifting system with a compact drive system for a belt drive.

It is a further object of the present invention to provide an alternative to the prior art.

SUMMARY OF THE INVENTION

Thus, the above described object and several other objects are intended to be obtained in a first aspect of the invention by providing a platform lifting system for transporting a person or an object from at least a first level to a second level, wherein the platform lifting system comprises:

a drive unit, a platform, at least two vertical columns, wherein said columns are adapted to facilitate an up and a down movement of the platform, a drive system positioned on or within at least one of the two columns, wherein said drive system is adapted to facilitate the up and down movement of the platform, wherein the drive system is a closed end belt system comprising a toothed belt and a corresponding belt drive;

the belt drive comprises a rotatable drive wheel, a first set of a plurality of deflection wheels and a second set of a plurality of deflection wheels, the rotatable drive wheel is arranged between the first set of the plurality of deflection wheels and the second set of the plurality of deflection wheels, the rotatable drive wheel is connected to the drive unit and is in a drive-transmitting engagement with the toothed belt, the toothed belt enters the belt drive at a first opening, with the toothed belt moving in a first direction, and the toothed belt leaves the belt drive, at a second opening, with the toothed belt moving in a second direction, wherein the first set of the plurality of deflection wheels deflects the toothed belt from the first direction to engage the drive wheel, and the second set of the plurality of deflection wheels deflects the toothed belt, when the toothed belt is moving away from the drive wheel, so that the toothed belt is moving in the second direction.

The invention is particularly, but not exclusively, advantageous for obtaining a compact lifting system, where the potential positions of the platform lifting system are not limited to specific locations inside or outside a building. Thereby, the platform lifting systems of the invention can easily and reliable be mounted outside or inside already existing buildings without the need of modifying the building and/or architecture.

In the columns carrying the platform, a belt drive is installed to drive the movement of the lift. However, the belt drive is taking space in the columns requiring columns of a certain depth. Therefore, a compact belt drive is preferred to limiting the requirements to the depth of the columns.

Moreover, the platform lifting system, providing the opportunity of mounting the belt drive in a column, allows the lifting system to be mounted without the necessity of making room for the belt drive in the floor or in the ceiling of an associated building e.g. by making a hole in the floor or ceiling.

Further, the drive unit may be mounted vertically anywhere between the columns in a position, where the drive unit does not interfere with doors, access openings or windows. The drive unit is connected to the belt drive, to drive the drive wheel.

Therefore, the lifting system can be mounted at any desirable site inside or outside a building without the need of breaking or demolishing anything, such as making a hole for obtaining room for the belt drive and the drive unit.

Furthermore, the embodiment is particularly, but not exclusively, advantageous for obtaining a platform lifting system providing an easily accessible belt drive, so that the service and maintenance of the lifting system is made a lot more convenient and effective.

Within the context of the invention it should be understood, that when referring to at least "a first level" and "a second level", it is to be understood as two floors, which can be any floor in the building, and is not necessarily to be understood as the first floor and the second floor.

Some examples for the understanding:

The platform moving up:

"First level" = first floor & "second level" = second floor,

"First level" = first floor & "second level" = fourth floor, or

"First level" = basement & "second level" = first floor,

Etc.

The platform moving down:

"First level" = third floor & "second level" = second floor, or

"First level" = fifth floor & "second level" = first floor, or

"First level" = fourth floor & "second level" = basement,

Etc.

It should be understood that the platform may be able to move from more than only two levels. Such that the platform can also move to a third, fourth, fifth, sixth, etc. level within the context of the invention. The platform is moving between at least two levels, however no upper limit of levels should define the scope of the invention.

A drive unit drives the belt drive. Within the context of the invention, the drive unit preferably comprises a least:

a motor, preferably an electric motor a gear system, and a driving pulley.

The "Drive unit" may also within the invention be recognised and understood as a "motor box", "gear box" or the like.

Within the context of the invention, "closed end system" may be understood as a drive system comprising an endless configuration, such as a closed end belt system with an endless belt.

It should be understood that a belt or the like can be connected at its ends via a connecting element, preferably a laser-cut steel tube or another kind of tube or the like. Preferably, the platform is connected to the endless belt at the connecting element. The belt is via the connecting element "endless" in the sense that the ends are fixed in the same tube, and the ends can therefore not move in relation to each other.

Within the context of the invention, "belt drive" may be understood as a drive that drives the toothed belt; the drive wheel in the belt drive is engaging the toothed belt and moving the toothed belt, which is an endless belt. The toothed belt is connected to the platform, pulling the platform up or lowers the platform as the toothed belt is moved by the drive wheel in the belt drive. The drive wheel is connected to the drive unit, which are driving the drive wheel. The drive wheel can move in both directions either pulling the toothed belt one way or the other way, raising or lowering the platform. They diameter of the drive wheel may be only slightly smaller than the depth of the frame. For instance, the depth of the drive wheel may be less than 10% smaller than the depth of the frame. If the depth of the frame may be, for instance, 140 mm, the diameter of the drive wheel may be 120-130 mm.

In the belt drive there is a first set of a plurality of deflection wheels and a second set of a plurality of deflection wheels. Each set of deflection wheels comprises a number of small deflection wheels; there may be 3-10 deflection wheels. The diameter of each deflection wheel may be less than 1/10, less than 1/8, less than 1/7, less than 1/6 of the diameter of the drive wheel.

Within the context of the invention, "deflect the toothed belt" is to be understood as the toothed belt is being turned to move in a different direction.

The number of small deflection wheels in the first set of the plurality of deflection wheels may be placed so that they insures a gradual deflection of the toothed belt from the direction the toothed belt is moving, when it enters the belt drive frame to the direction it moves, when it engages the drive wheel. This ensures the deflection of the toothed belt to be smooth with a minimum strain in the toothed belt.

In addition, the second set of the plurality of deflection wheels may be placed so that it ensures a gradual deflection of the toothed belt from the direction it moves when is disengages the drive wheel and to it moves in the direction it exit the frame of the belt drive.

The first set of deflection wheels is the set of deflection wheels the toothed belt first encounters when it enters the frame of the belt drive and the second set of deflection wheels are the deflection wheels the toothed belt encounters after it leaves the drive wheel. It is to be understood that when the toothed belt changes its direction of movement to be in the opposite direction, the definition of the first set of deflection wheels and the second set of deflection wheel are interchanged. It is always the set of deflection wheels, which the toothed belt encounter first when it enters the frame, which is defined as the first set of deflection wheels. Further, the set of deflection wheels that the toothed belt encounters after engaging the drive wheel is always defined as the second set of deflection wheels.

The drive system comprises at least one toothed belt and a belt drive. The toothed belt and the belt drive is mounted in one of the vertical columns.

The drive wheel comprises teeth, which are engaging the toothed belt. The toothed belt may for instance be an Elatech Eagle 14M, which is a polyurethane timing belt with a helical offset tooth, high tensile load steel cords and high torque capacity, however other belts may also be used. It is important that the belt is not drawn longer by greater weight; the platform may for instance have a weight of 300 kg, and the platform may for instance in a preferred embodiment be able to carry a rated load of 400 kg. Further, there may be a safety factor for the drive system to be able to carry 12 times the rated load.

Therefore, the requirements to the toothed belt is quite high, and also the drive system and the belt drive must be able to carry a considerable weight. When carrying a high weight the toothed belt must be rigid enough not to be drawn to be longer. At the same time, the toothed belt must be flexible enough the engage with the drive wheel. The advantage, of the belt drive having deflection wheels gradually allowing the toothed belt to deflect its direction, is that even a rigid toothed belt can be deflected to engage the drive wheel.

Alternatively, the drive system may comprises two toothed belts and two corresponding belt drives. One toothed belt and one belt drive mounted in each of the two vertical columns. The same drive unit placed between the two columns may drive both the belt drives.

In an embodiment of the invention, the drive wheel, the first set of the plurality of deflection wheels and the second set of the plurality of deflection wheels displaces the toothed belt so that the first opening, where the toothed belt enters a frame, and the second opening, where the toothed belt leaves the frame, are positioned on a line substantially parallel with the up and down moving direction of the platform.

In the drive system the toothed belt is moving around in a closed loop, basically with the toothed belt moving up in one plane parallel with the up and down moving direction of the platform and down in another plane also parallel with the up and down moving direction of the platform. When the toothed belt is pulled through the belt drive by the drive wheel, the toothed belt is displaced by the first set of deflection wheels away from the parallel plane to engage with the drive wheel. After disengaging with the drive wheel, the second set of the plurality of deflection wheels displaces the toothed belt back to the original parallel plan.

Within the context of the invention, "frame" may be understood as a structure, which holds the drive wheel and the deflection wheels. It may be a relative open structure, with a first opening and a second opening. The first opening and the second opening are passages allowing the toothed belt to move into and out of the belt drive.

Within the context of the invention "displaces the toothed belt" is to be understood as the toothed belt is being turned to move in different directions, first by the first set of deflection wheels, then by the drive wheel and finally by the second set of deflection wheels. When the toothed belts enter the frame, it moves in a first direction, and when it leaves the frame, it moves in a second direction. However, when passing through the frame the toothed belt may move in many different directions as the toothed belt is deflected or displaced by the first set of deflection wheels, the drive wheel and the second set of deflection wheels.

In an embodiment of the invention, the first direction and the second direction of the toothed belt substantially is in the same direction.

Preferably, the toothed belt enters the frame and leaves the frame moving in the same direction. That is to be understood, as the toothed belt is moving in the same direction, when it leaves the frame, as it moved in, when it entered the frame. However, between entering the frame and leaving the frame the toothed belt has been deflected or displaced first by the first set of deflection wheels, then by the drive wheel and finally by the second set of deflection wheels.

Alternatively, the toothed belt may move in a different direction when it leaves the frame. For instance, if the frame is placed in a corner of a column, then the toothed belt may leave the frame in a direction perpendicular to the direction it moved in when it entered the frame.

In an embodiment of the invention, the drive wheel, at least the majority of the first set of the plurality of deflection wheels and/or at least the majority of the second set of the plurality of deflection wheels are placed between two parallel lines, which are tangents to the drive wheel in parallel with the up and down moving direction of the platform.

To obtain a belt drive with a minimum depth, and thereby obtain a compact belt drive, the first and second set of the plurality of deflection wheels substantially are placed besides the drive wheel. When two parallel lines that are tangents to the drive wheel and are parallel to the up and down moving direction of the platform, the majority, preferably all, of the plurality of deflections wheels are placed between those two parallel lines.

The advantage is that the plurality of deflection wheels substantially do not require more space in the direction perpendicular to the direction of movement of the platform than the drive wheel requires. Thereby a compact belt drive is acquired, which does not take more space perpendicular to the direction of movement of the platform in the columns than absolutely needed.

In an embodiment of the invention, the depth of the frame is less than 130%, more preferable less than 120%, and even more preferable less than 110% of the diameter of the drive wheel.

With the first and second set of the plurality of deflection wheels substantially are placed besides the drive wheel, the depth of the frame containing the drive wheel and the first and second set of the plurality of deflection wheels may only be slightly deeper than the diameter of the drive wheel. Thereby obtaining a compact belt drive.

In an embodiment of the invention, the at least two columns are mounted on a wall or a floor deck of an associated building.

The embodiment is particularly, but not exclusively, advantageous for obtaining a lifting system that can be mounted on any suitable wall of an associated building or on a floor deck of an associated building and thereby more or less on any desirable place in or on a building. The wall can be either an inside wall or an outside wall.

The type of wall of floor deck should not be limiting for the invention; however, the wall construction should be suitable for bearing some weight of the lifting system.

In an embodiment of the invention, the depth of the belt drive is less than the depth of the vertical columns, preferable less than half the depth of the columns.

The belt drive is placed in the vertical columns and is made so compact that the depth of the columns can be minimized to contain the belt drive in the column.

In an embodiment of the invention, the first set of the plurality of deflection wheels are fixed at fixing points that are points on a substantially continuous curve and/or the second set of the plurality of deflection wheels are fixed at fixing points that are points on a substantially continuous curve.

Locating the first set of the plurality of deflection wheels on a substantially continuous curve has the advantage to minimize the strain on the toothed belt when it is deflected from the direction of movement to engage the drive wheel.

And also locating the second set of the plurality of deflection wheels on a substantially continuous curve has the advantage to minimize the strain on the toothed belt when it is deflected from engaging the drive wheel back into the direction of movement parallel with the up and down moving direction of the platform.

The continuous curve may be a partial circle, a partial oval, or the curve defined by a polynomial.

In an embodiment of the invention, the first set of the plurality of deflection wheels are fixed at fixing points that are points on a partial circle, wherein the radius of the partial circle is larger than the radius of the drive wheel.

Preferable, the curve, whereon the fixing points are placed, are a circle curve, where the radius of the partial circle is larger than the radius of the drive wheel. This ensures a smooth deflection of the toothed belt from the direction it is moving to engage the drive wheel.

In an embodiment of the invention, the second set of the plurality of deflection wheels are fixed at fixing points that are points on a partial circle, wherein the radius of the partial circle is larger than the radius of the drive wheel.

In an embodiment of the invention, the drive unit is mounted between the two columns, said drive unit can be placed anywhere within an area defined by the two columns.

The advantage of having the drive unit mounted between the two columns is that it is placed in the area of the columns and do not require extra space for the lifting system. Further, by placing the drive unit between the columns allow for easy connection of the drive unit to the drive wheel of the belt drive.

Further, the drive unit can be placed anywhere vertically between the two columns. Being able to place the drive unit anywhere vertically gives the flexibility that the lifting system can be adapted to any architecture independent of placements of doors, access openings and windows.

In an embodiment of the invention, the belt drive is mounted in one of the vertical columns and is connected to the drive unit.

In an embodiment of the invention, at least one belt drive is mounted in each vertical column.

When having two columns it as an advantage to have belt drives and toothed belts mounted in both columns, to divide the work load between the two belt drives and toothed belt reducing the load on each belt drive and each toothed belt.

A method for moving a platform of a platform lifting system from at least a first level to second level according to a second aspect of the invention, the platform lifting system comprises A drive unit, a platform, at least two vertical columns, wherein said columns are adapted to facilitate an up and a down movement of the platform, a drive system positioned on or within at least one of the two columns, wherein said drive system is adapted to facilitate the up and down movement of the platform, wherein the drive system is a closed end belt system comprising a toothed belt and a corresponding belt drive;

the belt drive comprises a rotatable drive wheel, a first set of a plurality of deflection wheels and a second set of a plurality of deflection wheels and a frame, wherein the method comprises at least the steps of:

initiating the drive system, the drive system engaging the rotatable drive wheel, the rotatable drive wheel engaging the toothed belt, moving the toothed belt through the belt drive, the first set of the plurality of deflection wheels deflecting the toothed belt from the first direction to engage the drive wheel, the second set of the plurality of deflection wheels deflecting the toothed belt, when the toothed belt is moving away from the drive wheel, so that the toothed belt is moving in the second direction, the toothed belt facilitating an up or down movement of the platform.

This aspect of the invention is particularly, but not exclusively, advantageous in that the method according to the present invention may be implemented by using a belt drive. The belt drive is first deflecting the toothed belt to engage the drive wheel and then deflecting the toothed belt, when it is moving away from the drive wheel, to facilitate the up and down movement of the platform.

When the lifting system is used, the drive system is initiated. Typically by a person pushing a bottom selecting to move to another level. When moving to another level is chosen, a computer system, which is part of the drive system and preferable placed in the drive unit, may be started. The computer is initiating the drive system and the computer system may perform a program to move the lift to the selected level. When initiated, the computer is controlling the motor of the drive unit, which is engaging the rotatable drive wheel and the rotatable drive wheel is engaging the toothed belt, which starts moving. The toothed belt facilitates the up and down movement of the platform by being connected to the platform. When the drive wheel engages the toothed belt to move it up and down it results in a movement of the platform, so the platform moves up or down to the selected level.

The invention further relates to a third aspect of the invention being a computer program comprising instructions, which, when the program is executed by a computer, cause the computer to carry out the method of the second aspect.

The first, second and third aspect of the present invention may each be combined with any of the other aspects. These and other aspects of the invention will be apparent from and elucidated with reference to the embodiments described hereinafter.

BRIEF DESCRIPTION OF THE FIGURES

The platform lifting system according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
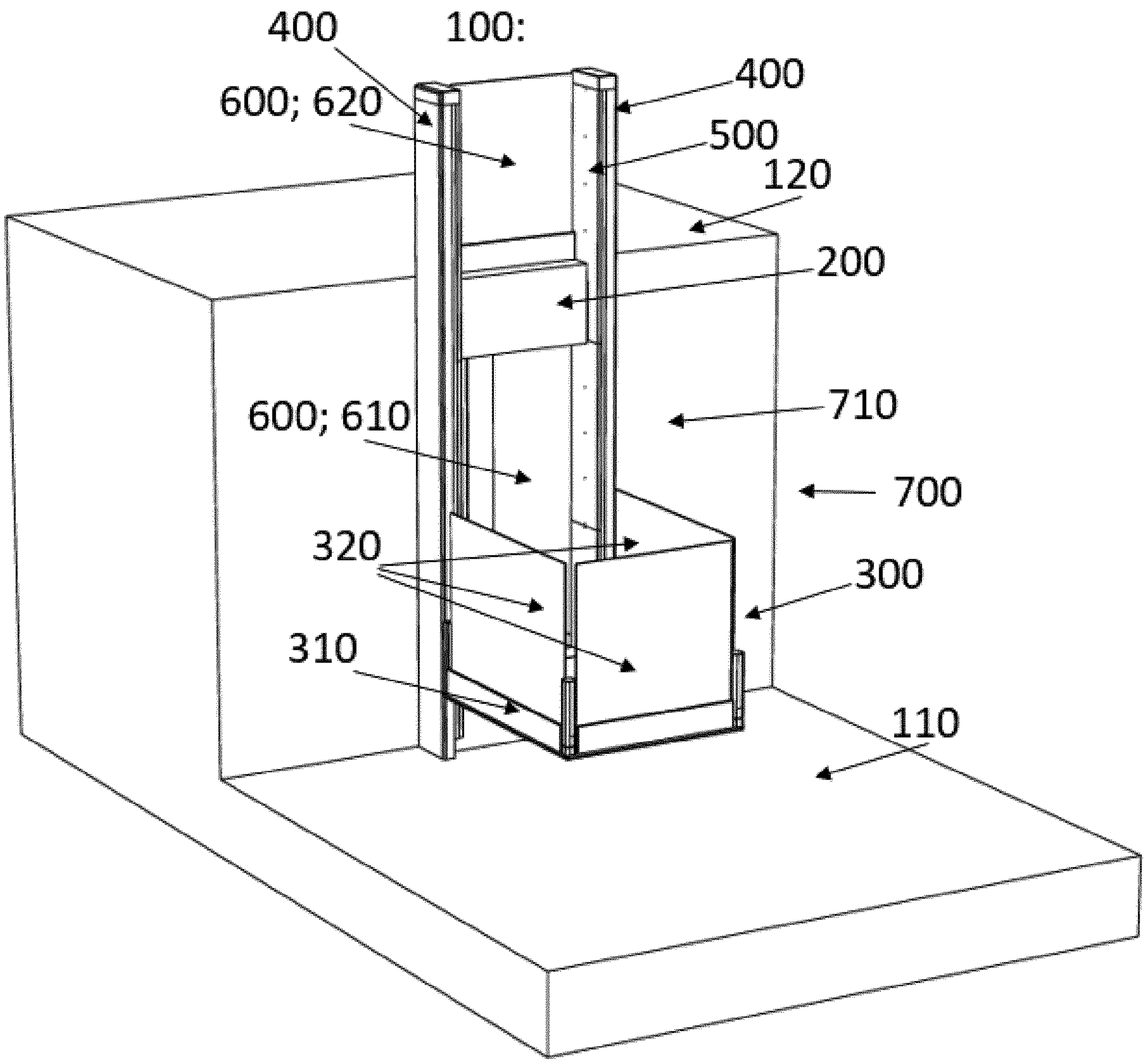
FIG. 1 illustrates a lifting system mounted on a wall and comprising a drive unit placed between two columns.

FIG. 1 illustrates a lifting system 100 mounted on a wall 710 and comprising a drive unit 200 placed between two columns 400. The lifting system illustrated is a platform lifting system for transporting a person or an object from at least a first level 110 to a second level 120, wherein the platform lifting system comprises:

A drive unit 200.

In FIG. 1, the drive unit is positioned in the middle part between two columns 400, however said drive unit 200 can be placed anywhere within an area defined by the two columns 400. The drive unit has a depth being equal or less than the depth of the two columns, enabling the platform 300 to pass the drive unit 200 when moving up or down on the two columns 400.

A platform 300.

In FIG. 1, the platform 300 is illustrated as an open platform with a bottom 310 and sidewall 320 in a safety height. The sides 320 are preferably made of glass; however, the material of the sides can vary depending on the desired construction. The platform lift 300 illustrated is an open platform, said open platform has an open top. However, within the invention, the platform could also be a closed platform, such as a cabin, or more "partly" closed such as providing the platform with a roof or other kind of top cover.

At least two vertical columns 400, wherein said columns are adapted to facilitate an up and a down movement of the platform 300.

A drive system 500 (not directly illustrated in FIG. 1) positioned on or within at least one of the two columns 400, wherein said drive system 500 is adapted to facilitate the up and down movement of the platform 300. The drive system 500 of the lifting system is preferably a closed end belt system.

At least two access openings 600, 610, 620.

The access opening may be provided by at least one of the sides 320 of the platform acting as an access opening 600, 610, 620. Alternatively, the access opening 600, 610, 620 is through the wall 710.

Furthermore, the lifting system 100 of FIG. 1 illustrates the possibility of having a first access opening 610 through the wall 710 of the associated building. Preferably, the first access opening 610 is positioned between the two columns 400 and positioned at least substantially at the bottom of the two columns, such that an access opening 600 in the lowermost floor level is provided. A second access opening 620 is being positioned between the two columns 400 and above the first access opening 610, preferably positioned above the drive unit 200, The lifting system 100 illustrated in FIG. 1 can be a lifting system mounted on an outdoor wall 710 of an associated building 700, or mounted on an indoor wall of an associated building.

Figure 2:
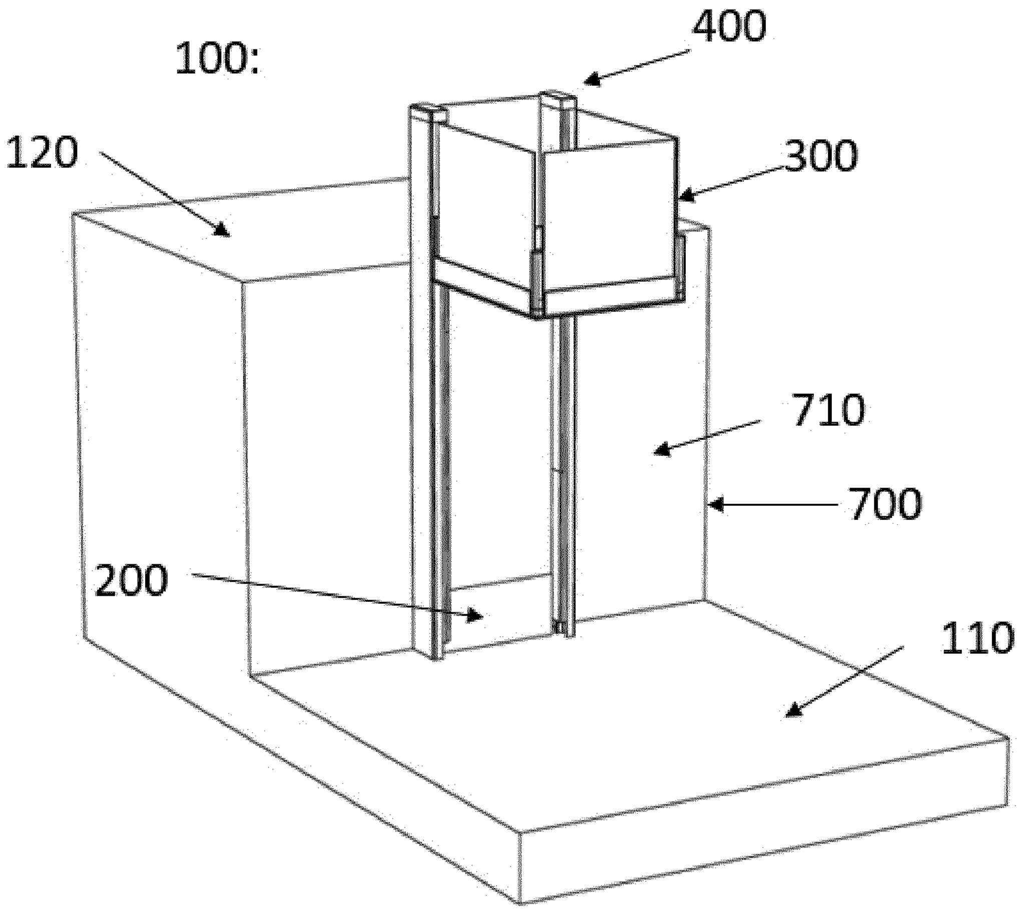
FIG. 2 illustrates the lifting system mounted on a wall, where the platform compared to FIG. 1 is lifted up to the second level.

FIG. 2 illustrates the lifting system 100 mounted on a wall 710, where the platform 300 compared to FIG. 1 is lifted up to the second level 120.

Within the invention, the drive unit can be mounted on a wall 710 of an associated building 700. The drive unit may also be called a "freely placeable" drive unit 200, meaning that as long the drive unit 200 is mounted between the two columns 400, it can be mounted anywhere within the area defined by the two columns 400.

Figure 3:
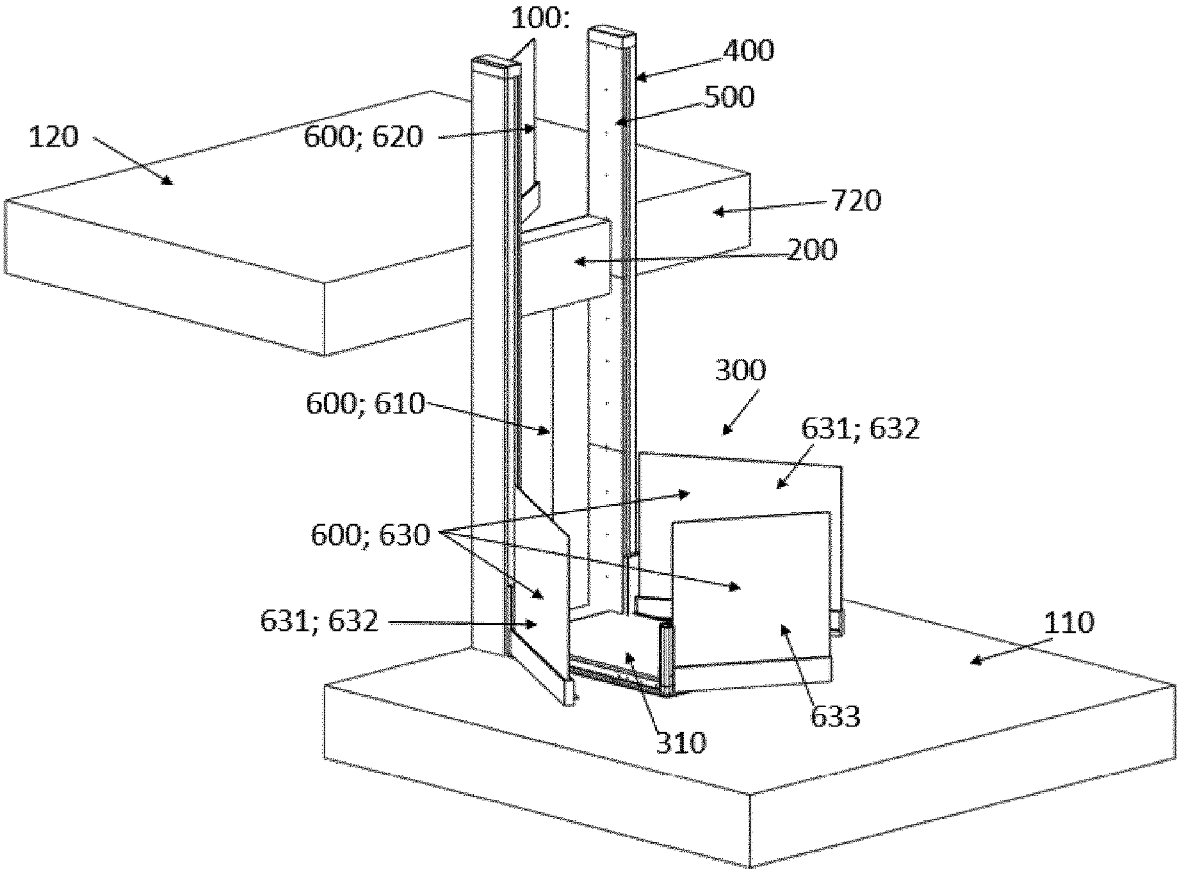
FIG. 3 illustrates the lifting system mounted on a floor deck and illustrates potential access openings.

FIG. 3 illustrates the lifting system 100 mounted on a floor deck 720, and FIG. 3 further illustrates potential access openings 600. The lifting system is a platform lifting system for transporting a person or an object from at least a first level 110 to a second level 120. Within the invention, the lifting system 100 can comprise a plurality of access openings 600, and it should be understood, that the number of access openings 600 should not be limiting for the scope of the invention. In FIG. 3, potential access openings are illustrated, wherein the platform lifting system 100 has at least three access openings:

the first access opening 610 being positioned between the two columns 400 and being under the floor deck 720, preferably positioned at least substantially at the bottom of the two columns 400 and below the drive unit 200. This first access opening 610 between the two columns is preferably within the invention comprising at least one door, such as a hinged door or a sliding door.

a second access opening 620 being positioned between the two columns 400 and above the first access opening 610, preferably positioned above the drive unit 200, a third 630, a fourth and a fifth access opening being positioned at the platform 300 and being:

a platform front access opening 633, and a first platform side access opening 631, and a second platform side access opening 632.

The access openings 600 of the platform lifting system 100 illustrated in FIG. 3 should be understood only as illustrative. It would be rare that all the three sides of the platform 300 are all acting as access openings 600 at the same time and within the same lift configuration, however it is in principle possible. The access openings 630 of the platform 300 are illustrated as gates; however, the openings could also take other configurations than gates.

Figure 4:
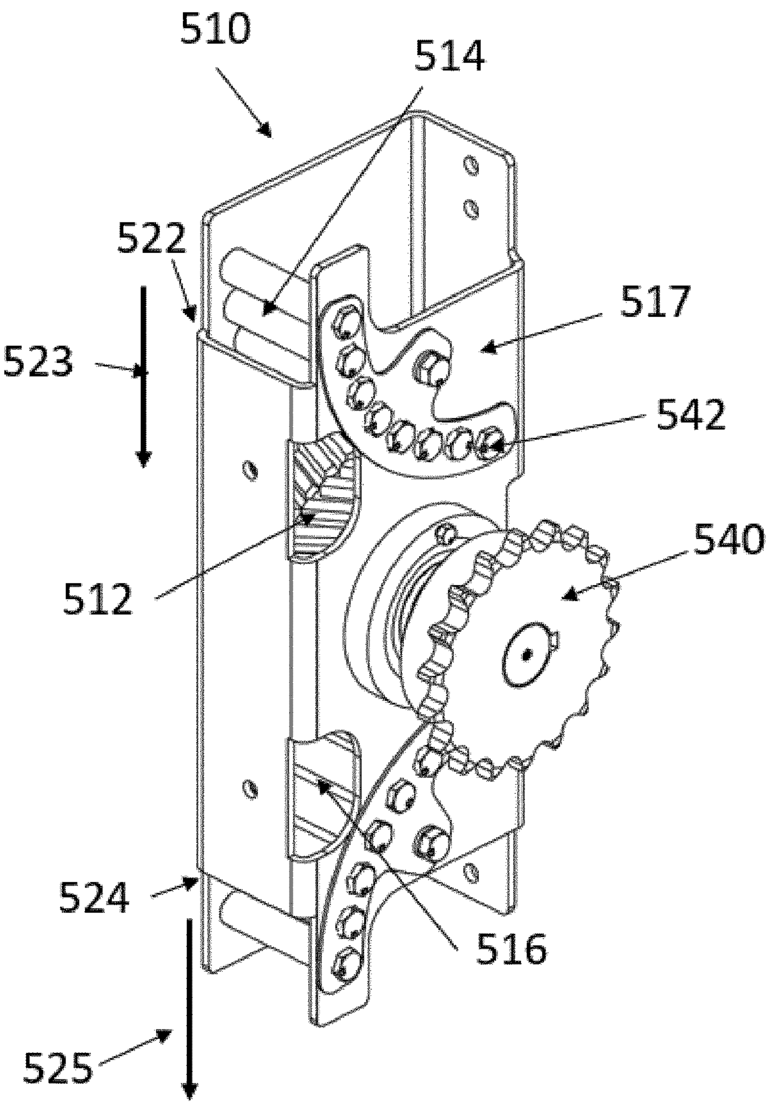
FIG. 4 illustrates the belt drive.

FIG. 4 illustrates the belt drive 510. The belt drive comprises a frame 517. In the frame is placed the rotatable drive wheel 512 between the first set of the plurality of deflection wheels 514 and the second set of the plurality of deflection wheels 516. A drive shaft coupling sprocket 540 is connected to the drive unit. The drive unit is engaging the sprocket 540, which is connected to the drive wheel 512. The drive unit can turn the sprocket 540 both ways, so the drive wheel 512 can turn both ways and pull the toothed belt 520 both ways through the frame 517, up or down. The toothed belt is not shown in FIG. 4, but can be seen in FIG. 5. The toothed belt enters the frame at a first opening 522 moving in the first direction, shown with the arrow 523. The toothed belt engages the first set of deflection wheels 514, which ensures that the toothed belt is gradually turned to engage the drive wheel 512. The drive wheel 512 engages with the toothed belt 520 and pulls the toothed belt through the frame 517. The second set of deflection wheels 516 then engages the toothed belt when it is moving away from the drive wheel 512, and the second set of deflection wheels 516 ensures the toothed belt gradually is turned to move in the second direction, shown with the arrow 525, and the toothed belts leaves the frame 517 at the second opening 524. The heads of the bolts 542 holding the deflection wheels is seen in FIG. 4. The bolts 542 is placed in fixing holes (not shown), which are placed at points on a continuous curve, preferably a circle curve.

Figure 5:
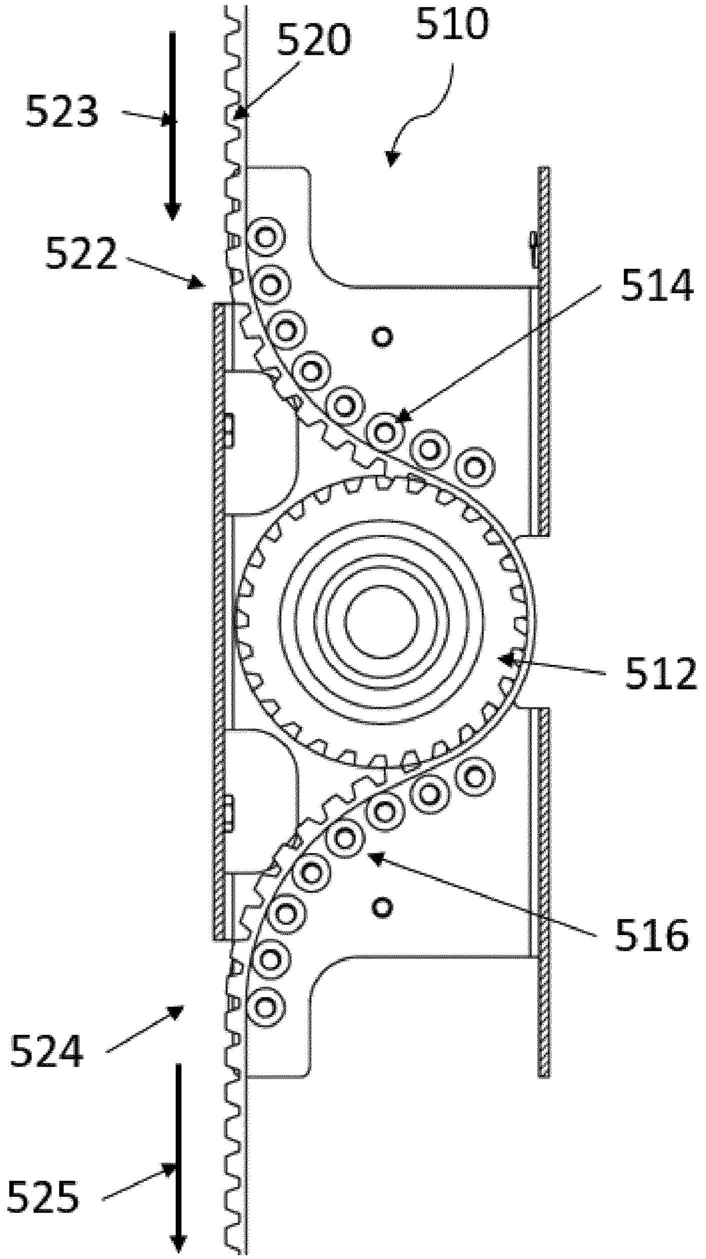
FIG. 5 illustrates a cross section of the frame, with drive wheel and deflection wheels inside the frame.

FIG. 5 illustrates a cross section of the frame 510, showing the drive wheel 512 placed between the first set of deflection wheels 514 and the second set of deflection wheels 516. The toothed belt 520 enters the frame at a first opening 522 moving in the first direction 523, and leaves the frame at the second opening 524 moving in the second direction 525.

Figure 6:
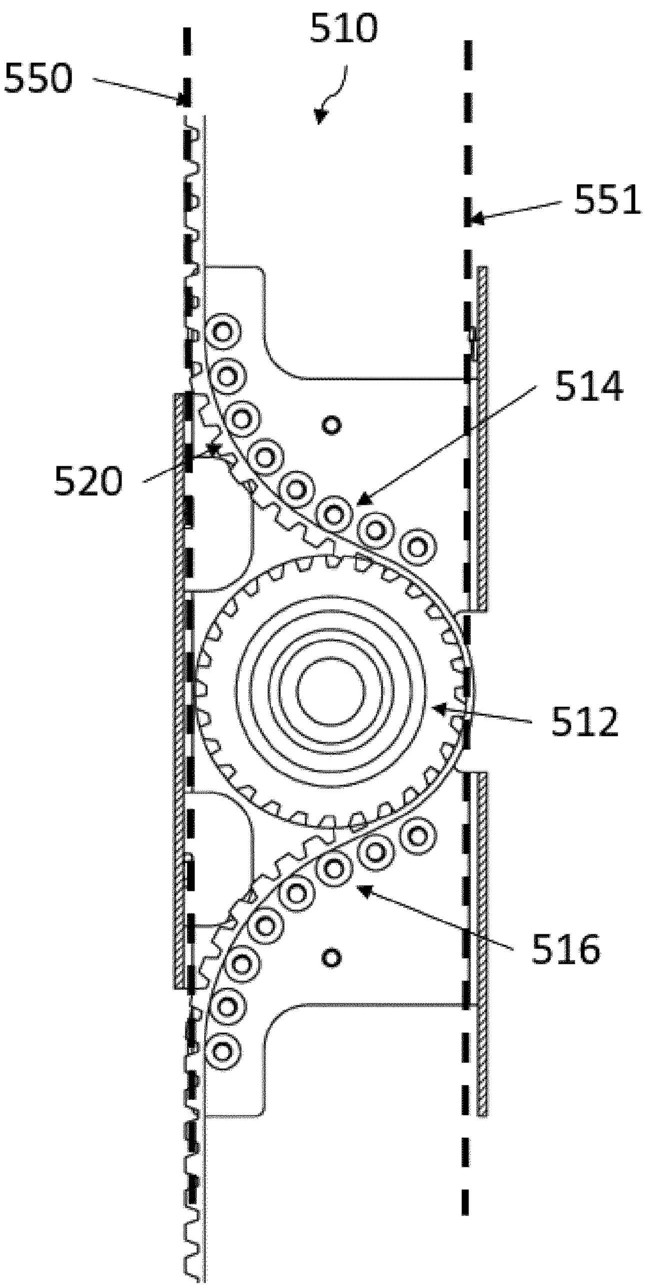
FIG. 6 illustrates the cross section of the frame, but also shows two parallel lines which are tangents to the drive wheel, and the majority of deflection wheels are placed inside the two parallel lines.

FIG. 6 illustrates the cross section of the frame 510, but also shows two parallel lines 550, 551. The parallel lines are tangents to the drive wheel 512 and are substantially parallel with the up and down moving direction of the platform 300. The first set of deflection wheels 514 and the second set of deflection wheels 516 are substantially located within these two parallel lines 550, 551.

The frame in a preferred embodiment has a depth of 140 mm, a width of 70 mm and a height of 380 mm. However, the size of the frame may vary depending on the requirements.

Figure 7:
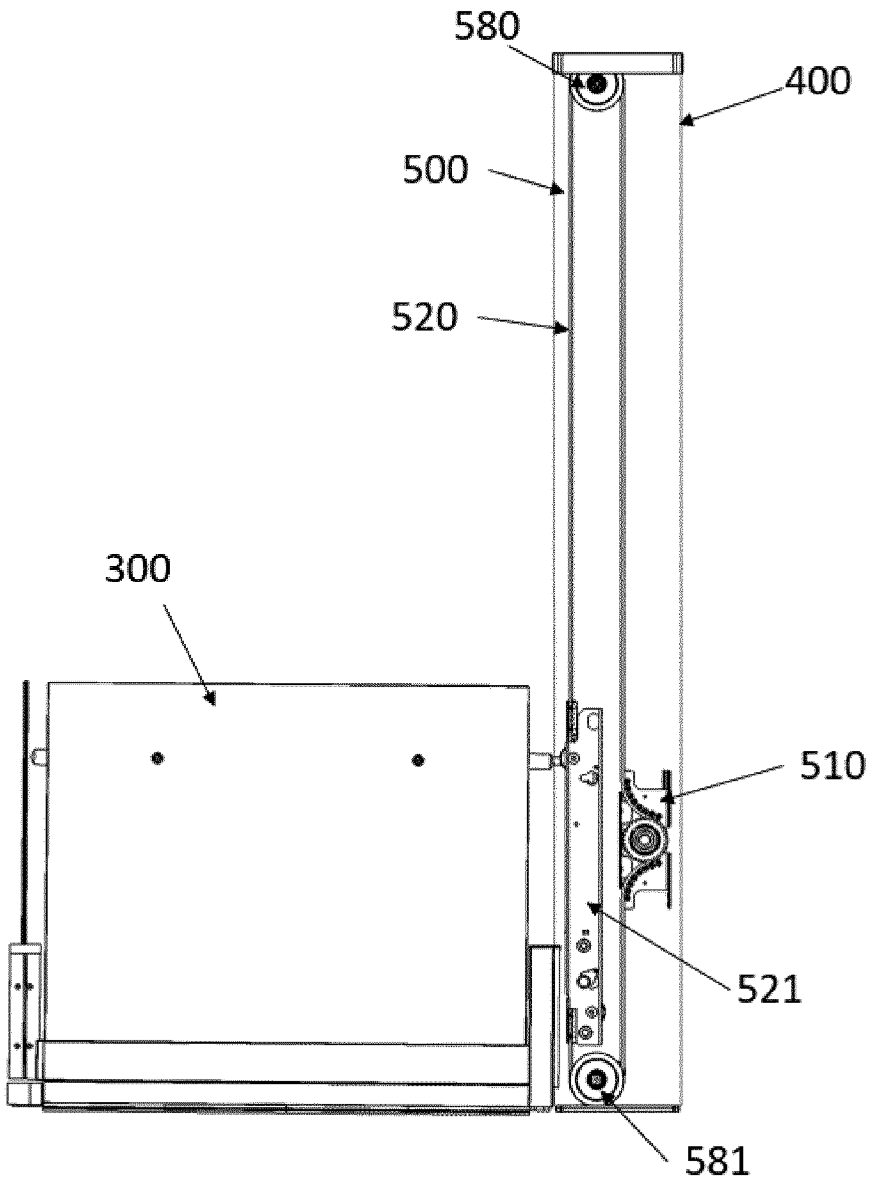
FIG. 7 illustrates the cross section of a column with the closed end drive system.

FIG. 7 illustrates the cross section of a column 400 with the closed end drive system 500. The closed end drive system 500 is a closed belt system with an endless toothed belt 520. The toothed belt 520 is connected at its ends to a connection element 521, preferably, a laser-cut steel tube or another kind of tube or the like. The platform 300 is connected to the toothed belt 520 at the connection element 521. The toothed belt 520 is fixed in both ends of the connection element 521, and the toothed belt is via the connection element "endless" in the sense that the ends of the toothed belt are fixed in the same tube and can therefore not move in relation to each other.

The drive system 500 is facilitating the up and down movement of the platform 300. The belt drive 510 is fixed in the column 400 and is pulling the toothed belt 520 up or down through the belt drive 510. In FIG. 7 the platform is in its lowest position, the belt drive then can pull the platform up by pulling down in the toothed belt 520, via a first pulley wheel 580, which the toothed belt passes over and around. The downward pull in the belt drive 510 is transformed to an upward pull in the platform, which causes the platform 300 to be moving up. In the lower end of the vertical column, a second pulley wheel 581 is placed. The toothed belt also passes around the second pulley wheel 581 and up through the belt drive 510.

Figure 8A:
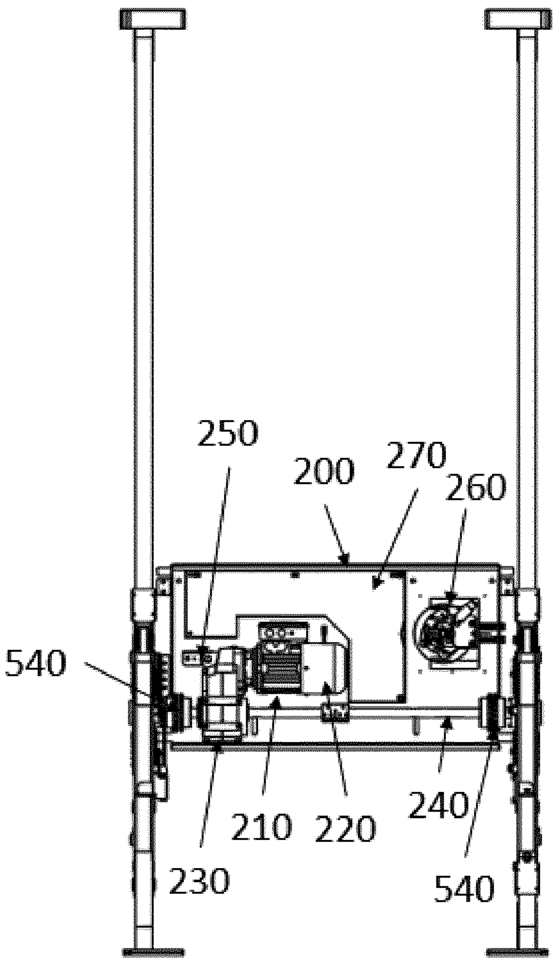
FIGS. 8*a* and 8*b* illustrates the drive unit and the connection between the drive unit and the belt drive.
Figure 8B:
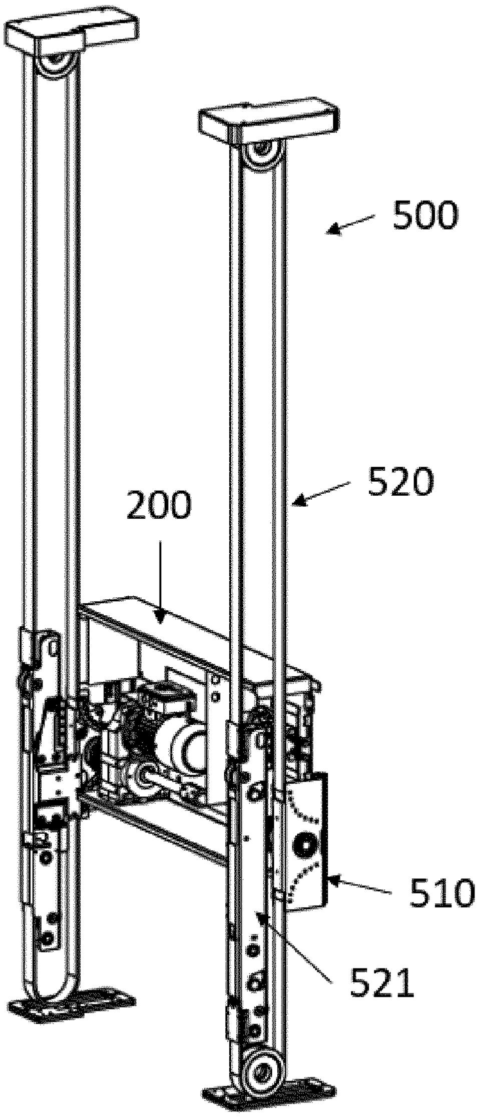

FIGS. 8*a* and 8*b* illustrates the connection between the drive unit 200 and the belt drive 510.

Within the context of the invention, the drive unit 200 preferably comprises a least:

A motor 210, preferably an electric motor, and preferably with a motor brake 220.

A gear system 230.

A driving pulley 240, being a driving axle on which a drive wheel 512 is mounted in both ends. The driving pulley 240 is connected to the drive wheel 512 by the sprocket 540. There may be two sprockets, one attached to the belt drive 510 and the drive wheel 512, and the other attached to the driving pulley 240. The two sprockets are then connected to each other preferable with a double chain engaging the teeth of both sprockets.

The drive unit further comprises:

An overload detector 250.

An overspeed governor 260.

Electric components 270 encased in a box to shield from EMC radiation (faraday cage).

The belt drive 510 is connected to the driving pulley 240, by the sprocket 540, which is driving the drive wheel 512 in the belt drive 510. The drive wheel then drives the toothed belt 520 in the drive system 500.

The drive unit 200 has a depth being equal or less than the depth of the two columns 400, enabling the platform 300 to pass the drive unit when moving up or down on the two columns.

In the embodiment shown in FIGS. 8*a* and 8*b* there are two column 400 and a drive system 500 is mounted in both columns, so the drive unit 200 pulls drive systems in both columns.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

In exemplary embodiments E1-E14, the invention may relate to:

E1. A platform lifting system (100) for transporting a person or an object from at least a first level to a second level, wherein the platform lifting system comprises:

a drive unit (200), a platform (300), at least two vertical columns (400), wherein said columns are adapted to facilitate an up and a down movement of the platform (300), a drive system (500) positioned on or within at least one of the two columns, wherein said drive system is adapted to facilitate the up and down movement of the platform, wherein the drive system (500) is a closed end belt system comprising a toothed belt (520) and a corresponding belt drive (510);

the belt drive comprises a rotatable drive wheel (512), a first set of a plurality of deflection wheels (514) and a second set of a plurality of deflection wheels (516), the rotatable drive wheel (512) is arranged between the first set of the plurality of deflection wheels (514) and the second set of the plurality of deflection wheels (516), the rotatable drive wheel (512) is connected to the drive unit (200) and is in a drive-transmitting engagement with the toothed belt (520), the toothed belt (520) enters the belt drive (510) at a first opening (522), with the toothed belt moving in a first direction (523), and the toothed belt leaves the belt drive, at a second opening (524), with the toothed belt moving in a second direction (525), wherein the first set of the plurality of deflection wheels (514) deflects the toothed belt (520) from the first direction (523) to engage the drive wheel (512), and the second set of the plurality of deflection wheels (516) deflects the toothed belt (520), when the toothed belt is moving away from the drive wheel (512), so that the toothed belt is moving in the second direction (525).

E2. The platform lifting system (100) according to embodiment E1, wherein the drive wheel (512), the first set of the plurality of deflection wheels (514) and the second set of the plurality of deflection wheels (516) displaces the toothed belt (520) so that the first opening (522), where the toothed belt enters a frame (517), and the second opening (524), where the toothed belt leaves the frame, are positioned on a line substantially parallel with the up and down moving direction of the platform 300.

E3. The platform lifting system (100) according to embodiment E1 or E2, wherein the first direction (523) and the second direction (525) of the toothed belt (520) substantially is in the same direction.

E4. The platform lifting system (100) according to any of the preceding embodiments, wherein the drive wheel (512), at least the majority of the first set of the plurality of deflection wheels (514) and/or at least the majority of the second set of the plurality of deflection wheels (516) are placed between two parallel lines (550, 551), which are tangents to the drive wheel (512) in parallel with the up and down moving direction of the platform.

E5. The platform lifting system (100) according to any of the preceding embodiments, wherein the depth of the frame is less than 130%, more preferable less than 120%, and even more preferable less than 110% of the diameter of the drive wheel (512).

E6. The platform lifting system (100) according to any of the preceding embodiments, wherein the at least two columns (400) are mounted on a wall (710) or a floor deck (720) of an associated building (700).

E7. The platform lifting system (100) according to any of the preceding embodiments, wherein the depth of the belt drive (510) is less than the depth of the vertical columns (400), preferable less than half the depth of the columns E8. The platform lifting system (100) according to any of the preceding embodiments, wherein the first set of the plurality of deflection wheels (514) are fixed at fixing points that are points on a substantially continuous curve and/or the second set of the plurality of deflection wheels (516) are fixed at fixing points that are points on a substantially continuous curve.

E9. The platform lifting system (100) according to any of the preceding embodiments, wherein the first set of the plurality of deflection wheels (514) are fixed at fixing points that are points on a partial circle, wherein the radius of the partial circle is larger than the radius of the drive wheel (512).

E10. The platform lifting system (100) according to any of the preceding embodiments, wherein the second set of the plurality of deflection wheels (516) are fixed at fixing points that are points on a partial circle, wherein the radius of the partial circle is larger than the radius of the drive wheel (512).

E11. The platform lifting system (100) according to any of the preceding embodiments, wherein the drive unit (200) is mounted between the two columns (400), said drive unit can be placed anywhere within an area defined by the two columns.

E12. The platform lifting system (100) according to any of the preceding embodiments, wherein the belt drive (510) is mounted in one of the vertical columns (400) and is connected to the drive unit (200).

E13. The platform lifting system (100) according to any of the preceding embodiments, wherein at least one belt drive (510) is mounted in each vertical column (400).

E14. A method for moving a platform of a platform lifting system (100) from at least a first level to second level, the platform lifting system comprises A drive unit (200), a platform (300), at least two vertical columns (400), wherein said columns are adapted to facilitate an up and a down movement of the platform (300), a drive system (500) positioned on or within at least one of the two columns, wherein said drive system is adapted to facilitate the up and down movement of the platform, wherein the drive system (500) is a closed end belt system comprising a toothed belt (520) and a corresponding belt drive (510);

the belt drive comprises a rotatable drive wheel (512), a first set of a plurality of deflection wheels (514) and a second set of a plurality of deflection wheels (516) and a frame (517), wherein the method comprises at least the steps of:

initiating the drive system (500), the drive unit (200) engaging the rotatable drive wheel (512), the rotatable drive wheel (512) engaging the toothed belt (520), moving the toothed belt through the belt drive (510), the first set of the plurality of deflection wheels (514) deflecting the toothed belt (520) from the first direction to engage the drive wheel (512), the second set of the plurality of deflection wheels (516) deflecting the toothed belt (520), when the toothed belt is moving away from the drive wheel (512), so that the toothed belt is moving in the second direction, the toothed belt (520) facilitating an up or down movement of the platform (300).

REFERENCE LIST

Platform lifting system (100)
First level (110)
Second level (120)
Drive unit (200)
A motor (210)
A motor brake (220)
A gear system (230)
A driving pulley (240)
An overload detector (250)
An overspeed governor (260)
Electric components (270)
Platform (300)
Platform bottom (310)
Platform sides (320)
Vertical column (400)
Drive system (500)
Belt drive (510)
Drive Wheel (512)
Deflection wheels (514, 516)
Frame (517)
Toothed belt (520)
Connecting element (521)
First opening (522)
First direction (523)
Second opening (524)
Second direction (525)
Drive shaft coupling sprocket (540)
Bolts (542)
Parallel lines (550, 551)
First pulley wheel (580)
Second pulley wheel (581)
Access Openings (600)
A first access opening (610)
A second access opening (620)
A third access opening (630)
A first platform lift side access opening (631)
A second platform lift side access opening (632)
A platform front lift access opening (633)
Associated building (700)
Wall of associated building (710)
Floor deck of associated building (720)

The invention claimed is:

1. A platform lifting system (100) for transporting a person or an object from at least a first level to a second level, wherein the platform lifting system comprises:

a drive unit (200), a platform (300), at least two vertical columns (400), wherein said columns are adapted to facilitate an up and a down movement of the platform (300), a drive system (500) positioned on or within at least one of the two columns, wherein said drive system is adapted to facilitate the up and down movement of the platform, wherein the drive system (500) is a closed end belt system comprising a toothed belt (520) and a corresponding belt drive (510);

the belt drive (510) comprises a rotatable drive wheel (512), a first set of a plurality of deflection wheels (514), a second set of a plurality of deflection wheels (516), and a frame (517), the frame holds the drive wheel (512) and the deflection wheels (514, 516), the rotatable drive wheel (512) is arranged between the first set of the plurality of deflection wheels (514) and the second set of the plurality of deflection wheels (516), the rotatable drive wheel (512) is connected to the drive unit (200) and is in a drive-transmitting engagement with the toothed belt (520), the toothed belt (520) enters the belt drive (510) at a first opening (522), with the toothed belt moving in a first direction (523), and the toothed belt leaves the belt drive, at a second opening (524), with the toothed belt moving in a second direction (525), wherein the first set of the plurality of deflection wheels (514) deflects the toothed belt (520) from the first direction (523) to engage the drive wheel (512), the second set of the plurality of deflection wheels (516) deflects the toothed belt (520), when the toothed belt is moving away from the drive wheel (512), so that the toothed belt is moving in the second direction (525), and wherein the first set of the plurality of deflection wheels (514) are fixed at fixing points that are points on a partial circle, wherein the radius of the partial circle is larger than the radius of the drive wheel (512).

2. The platform lifting system (100) according to claim 1, wherein the drive wheel (512), the first set of the plurality of deflection wheels (514) and the second set of the plurality of deflection wheels (516) displaces the toothed belt (520) so that the first opening (522), where the toothed belt enters the frame (517), and the second opening (524), where the toothed belt leaves the frame, are positioned on a line substantially parallel with the up and down moving direction of the platform 300.

3. The platform lifting system (100) according claim 1, wherein the first direction (523) and the second direction (525) of the toothed belt (520) substantially is in the same direction.

4. The platform lifting system (100) according to claim 1, wherein the drive wheel (512), at least the majority of the first set of the plurality of deflection wheels (514) and/or at least the majority of the second set of the plurality of deflection wheels (516) are placed between two parallel lines (550, 551), which are tangents to the drive wheel (512) in parallel with the up and down moving direction of the platform.

5. The platform lifting system (100) according to claim 1, wherein a depth of the frame is less than 130%, less than 120%, or less than 110% of the diameter of the drive wheel (512).

6. The platform lifting system (100) according to claim 1, wherein the at least two columns (400) are mounted on a wall (710) or a floor deck (720) of an associated building (700).

7. The platform lifting system (100) according to claim 1, wherein a depth of the belt drive (510) is less than the depth of the vertical columns (400), or less than half the depth of the columns.

8. The platform lifting system (100) according to claim 1, wherein the first set of the plurality of deflection wheels (514) are fixed at fixing points that are points on a substantially continuous curve and/or the second set of the plurality of deflection wheels (516) are fixed at fixing points that are points on a substantially continuous curve.

9. The platform lifting system (100) according to claim 1, wherein the second set of the plurality of deflection wheels (516) are fixed at fixing points that are points on a partial circle, wherein the radius of the partial circle is larger than the radius of the drive wheel (512).

10. The platform lifting system (100) according to claim 1, wherein the drive unit (200) is mounted between the two columns (400), said drive unit can be placed anywhere within an area defined by the two columns.

11. The platform lifting system (100) according to claim 1, wherein the belt drive (510) is mounted in one of the vertical columns (400) and is connected to the drive unit (200).

12. The platform lifting system (100) according to claim 1, wherein at least one belt drive (510) is mounted in each vertical column (400).

13. A method for moving a platform of a platform lifting system (100) from at least a first level to second level, the platform lifting system comprises platform lifting system (100) of claim 1, wherein the method comprises at least the steps of:

initiating the drive system (500), the drive unit (200) engaging the rotatable drive wheel (512), the rotatable drive wheel (512) engaging the toothed belt (520), moving the toothed belt through the belt drive (510), the first set of the plurality of deflection wheels (514) deflecting the toothed belt (520) from a first direction to engage the drive wheel (512), the second set of the plurality of deflection wheels (516) deflecting the toothed belt (520), when the toothed belt is moving away from the drive wheel (512), so that the toothed belt is moving in a second direction, the toothed belt (520) facilitating an up or down movement of the platform (300).

14. A platform lifting system (100) for transporting a person or an object from at least a first level to a second level, wherein the platform lifting system comprises:

a drive unit (200), a platform (300), at least two vertical columns (400), wherein said columns are adapted to facilitate an up and a down movement of the platform (300), a drive system (500) positioned on or within at least one of the two columns, wherein said drive system is adapted to facilitate the up and down movement of the platform, wherein the drive system (500) is a closed end belt system comprising a toothed belt (520) and a corresponding belt drive (510);

the belt drive (510) comprises a rotatable drive wheel (512), a first set of a plurality of deflection wheels (514), a second set of a plurality of deflection wheels (516), and a frame (517), the frame holds the drive wheel (512) and the deflection wheels (514, 516), the rotatable drive wheel (512) is arranged between the first set of the plurality of deflection wheels (514) and the second set of the plurality of deflection wheels (516), the rotatable drive wheel (512) is connected to the drive unit (200) and is in a drive-transmitting engagement with the toothed belt (520), the toothed belt (520) enters the belt drive (510) at a first opening (522), with the toothed belt moving in a first direction (523), and the toothed belt leaves the belt drive, at a second opening (524), with the toothed belt moving in a second direction (525), wherein the first set of the plurality of deflection wheels (514) deflects the toothed belt (520) from the first direction (523) to engage the drive wheel (512), the second set of the plurality of deflection wheels (516) deflects the toothed belt (520), when the toothed belt is moving away from the drive wheel (512), so that the toothed belt is moving in the second direction (525), and the second set of the plurality of deflection wheels (516) are fixed at fixing points that are points on a partial circle, wherein the radius of the partial circle is larger than the radius of the drive wheel (512).

* * * * *